A. J. DONOVAN AND F. POKORNY, JR.
GOVERNOR.
APPLICATION FILED MAY 1, 1920.
Reissued Nov. 21, 1922. 15,492.
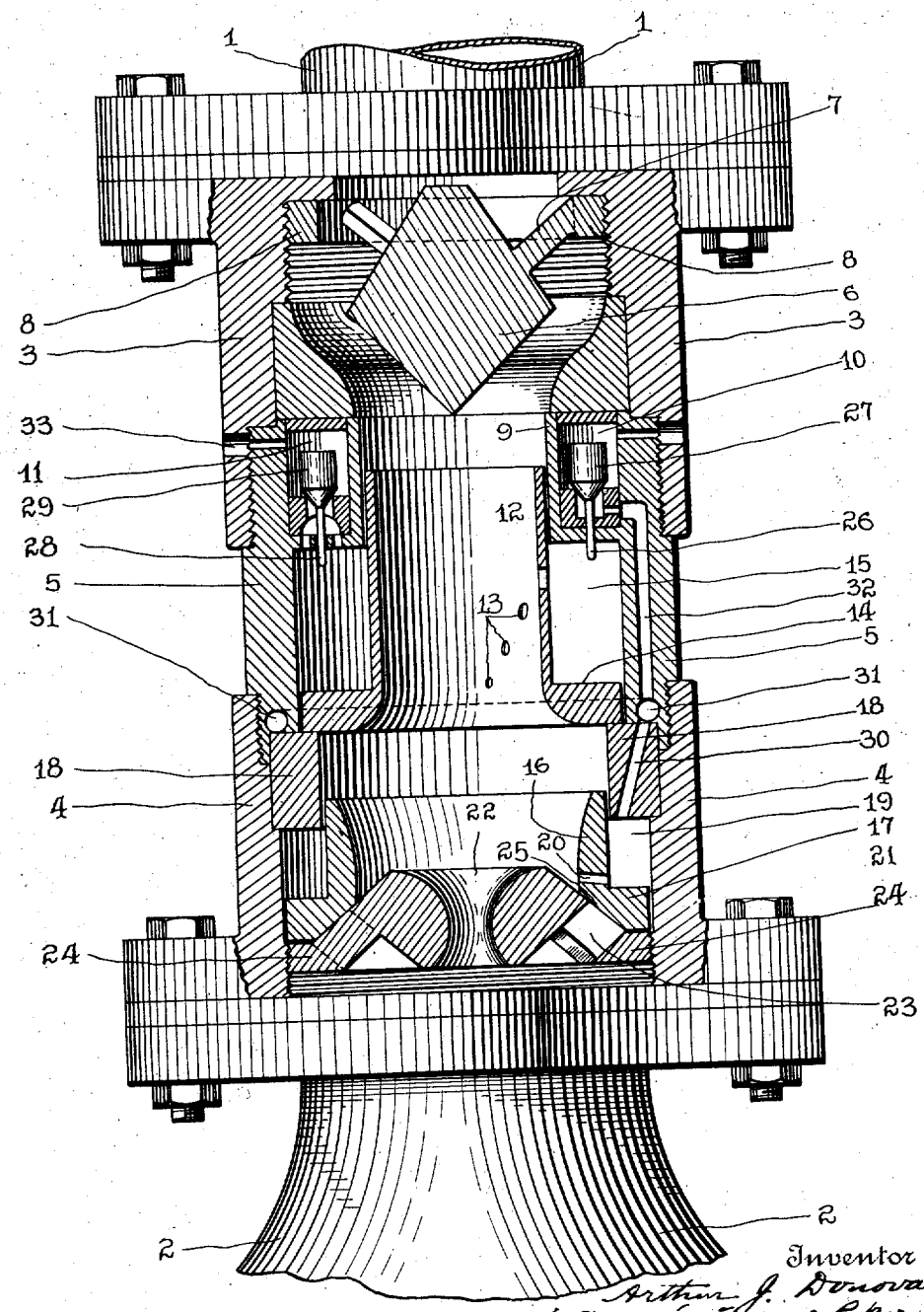
Inventor
Arthur J. Donovan
Frank Pokorny, Jr.
By their Attorney
F. W. Parker Reissued Nov. 21, 1922. Re. 15,492

UNITED STATES PATENT OFFICE.

ARTHUR J. DONOVAN AND FRANK POKORNY, JR., OF NEW YORK, N. Y., ASSIGNORS, BY DIRECT AND MESNE ASSIGNMENTS, OF ONE-HALF TO SAID POKORNY, AND ONE-HALF TO FRANCIS W. KEEGAN, BOTH OF NEW YORK, N. Y.

GOVERNOR.

Original No. 1,290,523, dated January 7, 1919, Serial No. 229,909, filed April 22, 1918. Application for reissue filed May 1, 1920. Serial No. 378,254.

*To all whom it may concern:*

Be it known that we, ARTHUR J. DONOVAN and FRANK POKORNY, Jr., citizens of the United States, and residents of borough of Manhattan, in the city, county, and State of New York, have invented certain new and useful Improvements in Governors, of which the following is a specification.

This application is division A of application for reissue of Patent No. 1,290,523, and the invention relates to governors for internal combustion motors, and it constitutes a variation of the two part, free piston comprised in our former application, Serial No. 228,286, filed April 12, 1918, wherein the separate elements of the free piston comprising supply and intake throttles, are herein independently controlled by separate vacuum chambers, and whereby an ample supply of fuel mixture is available under all conditions of governed intake requirements.

Other features and advantages of our said invention will hereinafter appear.

The drawing represents, enlarged, a vertical sectional view of the device.

In said view, 1 indicates the intake manifold of a motor, and 2 the carburetor, these elements being connected by an intermediate, cylindrical communicating device composed of an upper portion 3, lower portion 4, and central portion 5.

Located centrally in the upper end of portion 3, is a depending cone 6, which is centered therein by radial supporting arms 7, carried by a ring 8. In a horizontal plane, below the cone 6, we provide a concentric member 9, having valve chambers 10, 11; and slidable within member 9 is a hollow, gravity piston 12, having orifices 13 in its wall, and a lower, radial flange 14; the periphery of said flange being slidable against the inner wall of central portion 5. Thus the outer surface of piston 12, inner wall of portion 5, the flange 14, and the lower surface of member 9, together constitute the confines of a chamber 15 which is contractible with the upward movement of piston 6, and expansible with the fall of said piston. Motor aspirating force, while drawing a fuel charge from the carburetor, through the hollow piston 12, at the same time tends to exhaust chamber 15, through holes 13; and thus, by suction, lifts piston 12; whereby said piston approaches the cone 6 and functions as an engine throttle.

The other piston element, which serves as a supply throttle, consists of an annulus 16, having a radial flange 17 at its lower portion, the periphery of said flange being slidable against the inner surface of portion 4, in the movement of said annulus, whose outer surface rides against the inner surface of a concentric member 18, in the functioning of said piston element.

Thus a chamber 19 is bounded by the annulus 16, its flange 17, the portion 4 and the under surface of member 18; said chamber being contractible and expansible with the movement of said annulus. An orifice, as 20, through the annulus 16, permits exhaustion of the chamber 19 under the aspiratory force of the motor, thus rendering said annulus responsive in movement to that influence. Normally the annulus 16 is seated upon a base, as 21, which may form part of a choke device, here shown as a Venturi tube 22, connected, as by radial arms 23, with a threaded portion 24, screwed into portion 4. When the annulus is seated, as stated, the spaces between the arms 23 are thereby covered and fuel mixture can then only be drawn through the Venturi, flowing thus in restricted quantity, as for motor idling purposes; but when the annulus has been lifted up, then additional fuel passage is available through the spaces between the arms 23, and between the outer surface of Venturi tube and the under surface of the annulus 16, the extent and capacity of the passage varying according to the degree to which the annulus is raised.

The upward travel of annulus 16 is limited in extent by the lower surface of member 18, against which the flange 17 is arrested. At normal governed speed of the motor, operating under load, the tensional pull upon annulus 16, through chamber 19, in which a partial vacuum is created, as well as by the pressure that is exerted against the under, inclined surface 25 of said annulus, will tend to maintain the latter hovering midway in its range of movement, while providing a satisfying fuel supply.

It will be noted that the free piston or engine throttle device 12 has a longer range of travel than the supply throttle device 16, and that said devices function independently of each other, though actuated by the same raising force, viz, the aspiratory tension of the motor. When the member 12 approaches the limit of its upward, or engine throttling movement, its flange 14 meets the stem 26 of a valve 27, located in chamber 10; and it also meets the stem 28 of a valve 29, located in chamber 11. The continued upward movement of member 12 causes the valve 27 to become unseated, thereby opening chamber 19 to the atmosphere, as through a gland 30 in member 18, an annular passage 31, and a gland 32 in portion 5, thus breaking the partial vacuum in chamber 19, whereby the annulus 16 is released from the motor tensional sustaining force, as applied thereto through the rarefaction of chamber 19. At this time the motor will be throttled down, and the annulus 16, which falls to its seat by gravity, limits the passage of fuel at the supply throttle, until the motor throttle opens up to enable the motor to again speed up. But until the valve 27 is actuated in the manner described, the supply throttle 16, in normal governed operation of the motor, will remain suspended to permit the flow of a suitable fuel supply.

The flange 14 of engine throttle 12, at about the same time that it actuates valve 27, also meets the stem 28 of valve 29, seated in valve chamber 11, opening said valve, and thereby placing vacuum chamber 15 in communication with the atmosphere, through passage 33. The throttle or piston 12 is then released from the tensional support given it by the aspiratory force of the motor and may fall by gravity to the throttle full-open position, whereby the motor is again enabled to pick up speed. In the normal governed operation of the motor, however, the throttle member 12, like the throttle member 16, will hover between the respective limits of its range of movement.

The effect of providing each throttle element with a separate vacuum chamber, is to diminish the weight to be supported by either chamber, and thus to render the control more sensitive and readily responsive to the fluctuations of motor aspiratory tension.

When the vacuum chambers are opened to the atmosphere, then the motor tension is relieved with respect to the chambers 15 and 19, and the motor tension applies only to the lower surfaces of the valves 12 and 16.

With the lift of supply throttle 16 fuel mixture is caused to flow between the inclined surface 25 of said supply throttle and the outer wall of the venturi, this fluid flow being accorded a convergent direction by the inward and upward angle of said inclined surface 25, so that in fact the volume of fluid enters the passage in conoidal form. Since at the same time fuel mixture is also flowing, under the same suction influence created by the engine in its aspiratory operation, through the axial orifice of the venturi, it follows that the two separate volumes of fluid admitted to the passage enter into impinging relation which results in a fuel pulverizing action, whereby the fuel particles in each volume become more finely subdivided and all are more intimately intermingled in and dispersed throughout the combined volumes to constitute a highly combustible mixture. Also, due to the outwardly flared form of the venturi exit, the central stream of fluid mixture issuing therefrom tends to spread or diverge toward the other or convergent fuel mixture flow, which has the effect of intensifying the force of impact between the two volumes of fluid, thereby enhancing the value of the bombardment between the fluid streams in their fuel pulverizing and mixture making characteristics.

Variations may be resorted to within the spirit and scope of our said invention and parts thereof used without others.

We claim:—

1. In an internal combustion motor having a carbureter and a fuel passage, a freely movable gravity return throttle valve to control the supply of fuel to said passage, a separate, freely movable gravity return throttle to control the admission of fuel to the motor, said throttles adapted to be actuated by the aspiratory tension of the motor, and respective means for relieving the effect of the tensional pull of the motor as applied to said throttles.

2. In an internal combustion motor having a carbureter, the combination of a fuel passage, a Venturi supply tube therefor, an auxiliary fuel passage surrounding said venturi, and a gravity return throttle valve normally closing said auxiliary passage, said valve adapted to be actuated by the aspiratory tension of the motor.

3. In an internal combustion motor having a carbureter, the combination of a fuel passage, a gravity return throttle valve to control fuel supply to said passage, and a gravity return motor throttle valve, said valves adapted to be actuated by the aspiratory tension of the motor.

4. In an internal combustion motor having a carbureter, the combination of a fuel passage, a gravity return throttle valve to control fuel supply to said passage, a gravity return motor throttle valve, said valves adapted to be actuated by the aspiratory tension of the motor, and means for diminishing the effect of the aspiratory pull of the motor as applied to said valves.

ARTHUR J. DONOVAN.
FRANK POKORNY, Jr.